United States Patent [19]

Moberg

[11] Patent Number: 5,020,770
[45] Date of Patent: Jun. 4, 1991

[54] COMBINATION OF MOLD AND ALLOY CORE PIN

[76] Inventor: Clifford A. Moberg, W328 N4065 Allendale Dr., Nashotah, Wis. 53058

[21] Appl. No.: 193,728

[22] Filed: May 12, 1988

[51] Int. Cl.⁵ .............................................. B29C 33/38
[52] U.S. Cl. ..................................... 249/111; 249/135; 249/144; 249/175; 420/488
[58] Field of Search ................ 249/135, 175, 111, 144; 425/552, 577; 420/485, 488, 490

[56] References Cited

U.S. PATENT DOCUMENTS

| | | | |
|---|---|---|---|
| 3,635,702 | 1/1972 | Badia et al. | 420/488 |
| 3,676,310 | 7/1972 | Wishnie | 420/472 |
| 3,817,487 | 6/1974 | Riedel | 249/135 |
| 3,988,176 | 10/1976 | Watanabe et al. | 249/135 |
| 4,191,601 | 3/1980 | Edens et al. | 148/160 |
| 4,594,221 | 6/1986 | Caron et al. | 420/488 |

FOREIGN PATENT DOCUMENTS

| | | | |
|---|---|---|---|
| 1107943 | 5/1961 | Fed. Rep. of Germany | 420/488 |
| 59-145745 | 8/1984 | Japan | 420/488 |
| 614141 | 11/1979 | Switzerland | 249/135 |
| 616053 | 7/1978 | U.S.S.R. | 249/135 |
| 789653 | 1/1958 | United Kingdom | 420/488 |
| 1358055 | 6/1974 | United Kingdom | 420/488 |

OTHER PUBLICATIONS

Nichols, Malcolm A., "Use of Beryllium Copper in Plastic Molds", *India Rubber World*, N.Y., N.Y., Apr. 1952, pp. 80–81.

Moberg, Clifford, "Cycle-Time Reductions Through High-Thermal-Conductivity Metals", *Plastics Machinery & Equipment*, Feb. 1988.

Primary Examiner—James C. Housel
Attorney, Agent, or Firm—Willis B. Swartwout, III

[57] ABSTRACT

The combination of a mold body for molded plastics or the like with a materials alloy core pin which at one and the same time establishes an aperture in the molded material and substantially reduces the mold cooling time by being formed from an alloy which rapidly dissipates heat that includes copper, nickel, silicon and chromium. The percentages of each material in the alloy can vary in a range but there is a preferred percentage to total materials for rapid cooling purposes.

4 Claims, 1 Drawing Sheet

COMBINATION OF MOLD AND ALLOY CORE PIN

BACKGROUND OF THE INVENTION

The present invention relates to industrial and commercial molds and more particularly for industrial and commercial molds for plastic products.

The making of molds for use in producing any molded product is a great expense in the cost of production. Once a mold has been filled with the metal rubber or plastic from which the end product is to be made as an example the mold and contents must be allowed to cool sufficiently for the product to be removed before the mold can be reused. It can therefore be seen that a sufficient number of molds must be made so that the pouring of the molds may continue while some are cooling and being emptied. Such is the extreme cost of the molds so that forced cooling heat exchange mechanisms and structures and other ideas have been tried to speed the process and reduce the numerical need for molds.

A molded product often is required to have apertures therethrough or indentations in the surface which apertures or indentations are obtained through the use of core pins.

When the product is sufficiently cooled so as to be able to be withdrawn from the mold the core pin is extracted from the mold and the product then extracted. The core pin is ordinarily made from a different or differing material with relation to the rest of the mold body.

SUMMARY OF THE INVENTION

The present invention proposes to overcome at least some of the problems of the prior art by providing a mold body for the molding of plastic products or the like which is used in combination with one or more core pins made from an alloy of elements specifically selected from a particular group known for their ability to rapidly dissipate heat. Thus there will be a need for fewer molds to produce quantities of the end product relatively quickly.

It should be noted here that one or more core pins of the desirable alloy may be used flush with the interior mold surface even where there is no requirement for an aperture or indentation in the molded product.

Various elements are known for their ability to more radidly transfer or dissipate heat to the surrounding atmoshpere. Some of the better known elements are copper, nickel, silicon, chromium and cobalt. These elements may all be combined in an alloy or some from the group and not others in percentages relative to 100% or in ranges of percentages relative to 100% as may be desirable without departing from the spirit of the present invention.

Copper in the alloy would be not less than 90% of the 100%, however optimum performance is believed to be obtained at 96.5%. Nickel is believed to be most effective in the alloy at between 0% and 4%, however, optimum performance is believed to be obtained at 2.5%, Silicon is in the alloy at 0% and 0.6%, but optimum content is 0.6% of the total element contents. between Chromium is contained within the alloy at between 0% and 2%, but optimum performance is believed to be obtained at 0.4 % and cobalt, if used at all, is between 0% to 5%.

While this invention is primarily concerned with molds for plastic, the present invention could apply to molds for rubber, composition or similar products either man-made or existing in nature. Note also that while copper, nickel silicon and chromium are all effective within ranges in the projected alloy, cobalt need not be contained therein at all.

Various other objects and advantages of the present invention will become obvious or apparent as this description proceeds and such other objects and advantages as welll as those previously set forth herein are intended to be covered by the scope of the appended claims.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
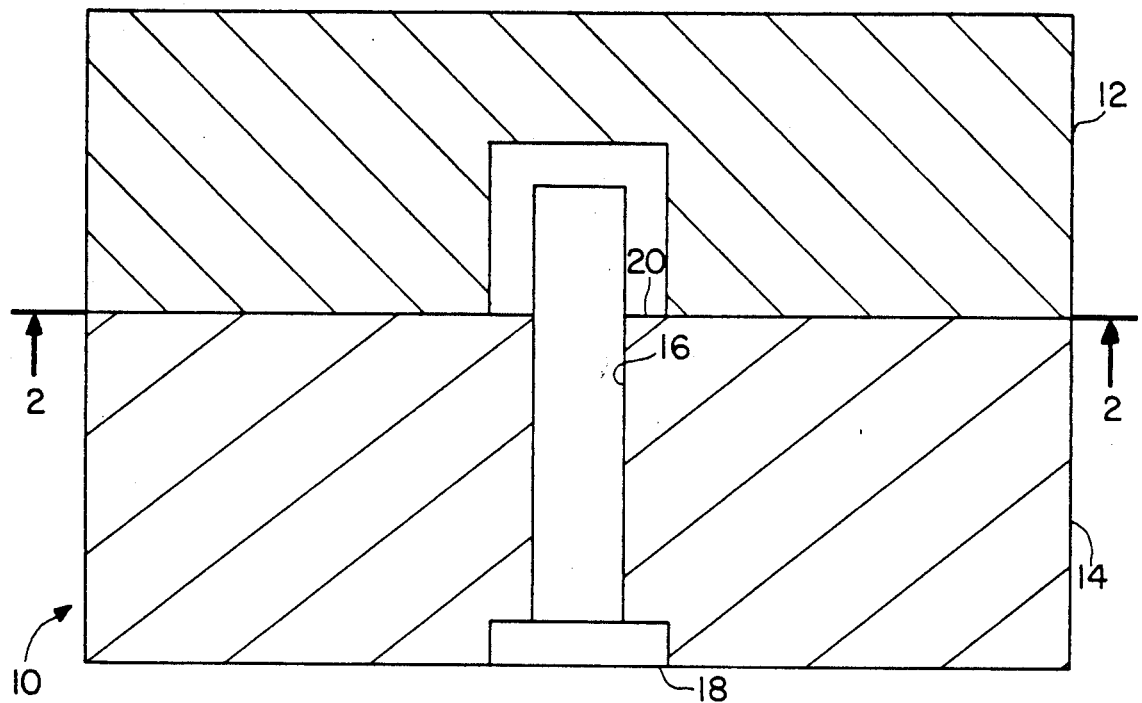
FIG. 1 of the drawings is a vertical cross-sectional view through a mold with core pin embodying the present invention.
Figure 2:
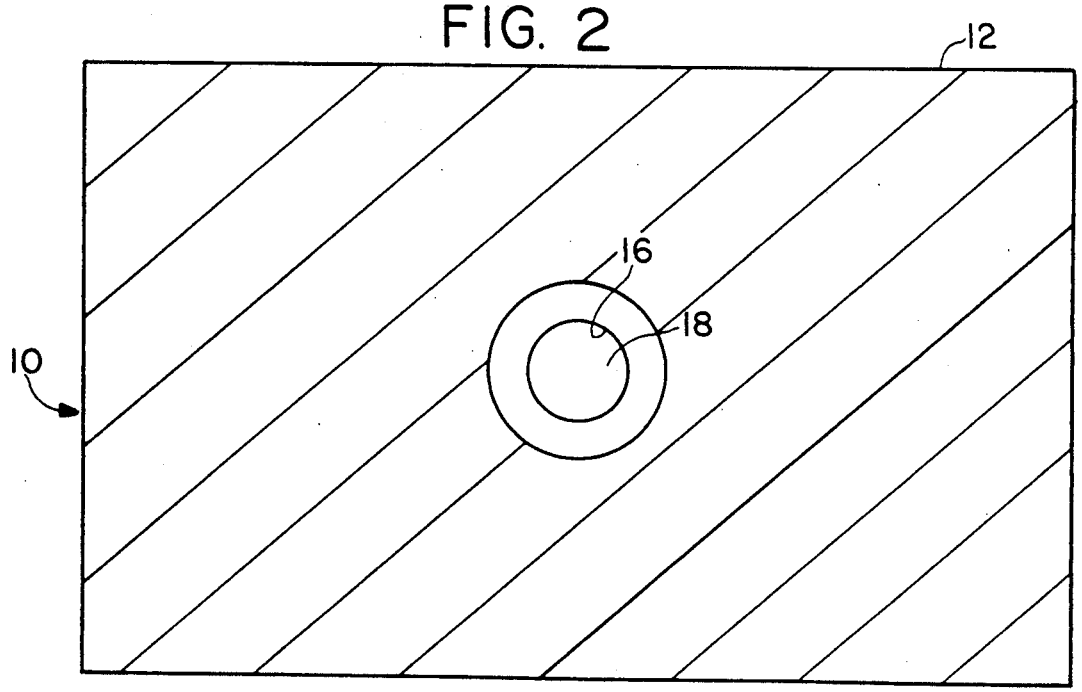
FIG. 2 is a horizontal cross-sectional view through a mold with core pin embodying the present invention along line 2—2 in the direction of the arrow.

Referring now to the drawings there is shown a mold structure generally identified by the numeral 10. Mold structure 10 may be made from any number of materials depending on the product which the mold is going to be used to produce. In the present instance the mold is to be used to produce a molded plastic product. Thus the mold material must be a metal or other product which will not be distorted by receiving thereon and therein a quantity of molten plastic at a relatively high temperature.

Mold structure 10 includes an upper mold body 12 and a lower mold body 14 including one or more core pin apertures 16 adapted to receive in frictional engagement therewithin a core pin 18. Close scrutiny of the drawings will reveal that core pin 18 is elongated sufficiently so that it will protrude into the mold space defined by the upper mold body 12 and when molten material is introduced into the upper mold body 12 pin 18 will create an aperture through the end molded plastic product.

It should be noted at this point that the length of pin 18 is determined by whether the desire is to create an aperture through the end plastic product or only an indentation in the end product or if no aperture or indentation is desired the pin is finished to be flush with inside surface 20 of mold 12.

Aside from the function of creating an aperture or indentation in the end product, a pin 18 would be used in this preferred embodiment, or more than one if desired, ending flush with the mold inner surface 20 strictly for the purpose of assisting the regular mold cooling process by more rapidly than otherwise would be the case dissipating the heat of the mold and molten product as the product cools and solidifies.

Pin 16 is made from a metal alloy containing copper, nickel, silicon and chromium. Under some circumstances, cobalt may also be added but is not required.

Copper content will always be at least 90% of the total metal content of the pin, but optimum content is 96.5%. Nickel content is in a range of 0% to 4% but optimum content is 2.5% of the total metal content of the pin. Silicon content is in a range of 0% and 5% but optimum content is 0.6%. Chromium content is in a range of 0% and 2% but optimum content is 0.4%.

Optimum quantities of copper, nickel, silicon and chromium insure maximum heat transfer potential of the core pin to carry out the mold cooling process forming a part of the present invention.

I claim:

1. A mold structure for molding a molten material comprising in combination:
   (a) a mold body defining a mold cavity therein;
   (b) core pin structure received within said mold body in frictional engagement therewith and extending into said cavity such that at least part of said pin will be in contact with the molten material when the material is introduced into said mold;
   (c) said core pin being an alloy of metals consisting of nickel, silicon, chromium and copper, said copper being 96.5% of such alloy; and
   (d) said mold structure being a metal excluding the alloy of the pin and having a greater resistance to thermal distortion than said core pin alloy.

2. The structure as set forth in claim 1, wherein nickel is included at 2.5% of the total material alloy of said pin.

3. The structure as set forth in claim 1, wherein silicon is included at .6% of the total materials alloy of said pin.

4. The structure as set forth in claim 1, wherein chromium is included at .4% of the total materials alloy of said pin.

* * * * *